US012578954B2

(12) United States Patent (10) Patent No.: US 12,578,954 B2
Das et al. (45) Date of Patent: Mar. 17, 2026

(54) CONTEXT AWARE VEHICLE OVER-THE-AIR (OTA) SOFTWARE/FIRMWARE (SW/FW) UPDATE

(71) Applicant: QUALCOMM Incorporated, San Diego, CA (US)

(72) Inventors: Soumya Das, San Diego, CA (US); Mohsen Bahrami, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/468,005

(22) Filed: Sep. 15, 2023

(65) Prior Publication Data

US 2025/0094153 A1 Mar. 20, 2025

(51) Int. Cl.
*G06F 9/44* (2018.01)
*G06F 8/65* (2018.01)
*H04W 4/44* (2018.01)
*H04W 4/48* (2018.01)

(52) U.S. Cl.
CPC ............... *G06F 8/65* (2013.01); *H04W 4/44* (2018.02); *H04W 4/48* (2018.02)

(58) Field of Classification Search
CPC ..... G06F 8/65; G06F 8/71; G06F 8/61; G06F 16/23; G06F 2221/2111; G06F 30/15; H04W 4/48; H04W 4/80; H04W 4/40; H04W 4/46; H04W 4/029; H04W 84/12; H04W 84/005; H04W 4/60; H04W 4/44; H04L 67/12; H04L 2209/84; H04L 2012/40215
See application file for complete search history.

(56) References Cited

U.S. PATENT DOCUMENTS

| | | |
|---|---|---|
| 11,055,089 B2 | 7/2021 | Shin |
| 2019/0108010 A1 | 4/2019 | Tillman et al. |
| 2019/0212997 A1 | 7/2019 | Sangameswaran et al. |

(Continued)

FOREIGN PATENT DOCUMENTS

EP 4071603 A1 10/2022

OTHER PUBLICATIONS

International Search Report and Written Opinion—PCT/US2024/038996—ISA/EPO—Nov. 8, 2024.

*Primary Examiner* — Chuck O Kendall

(74) *Attorney, Agent, or Firm* — Polsinelli LLP

(57) ABSTRACT

Various embodiments include methods for performing a software/firmware (SW/FW) update of a vehicle without draining the vehicle's battery below a threshold. A vehicle processing system may receive a SW/FW update inquiry that specifies a permissible time window for implementing the update and predict a residual vehicle battery level (RVBL) resulting from receiving and implementing the update based a current battery level. The processing system may transmit an update response to initiate over-the-air reception of the SW/FW update in response to predicting that the RVBL after receiving and implementing the SW/FW update will be above a threshold battery level based on a location of the vehicle and the PTW. Methods may further include transmitting a SW/FW update response that prevents initiation of the SW/FW update, at least temporarily, in response to predicting that the current vehicle battery level is below a minimum battery level threshold for performing the SW/FW update.

30 Claims, 8 Drawing Sheets

(56) References Cited

U.S. PATENT DOCUMENTS

| | | | |
|---|---|---|---|
| 2020/0393259 A1* | 12/2020 | Gantt, Jr. | ............... B60L 53/65 |
| 2022/0123570 A1* | 4/2022 | Fuchs | .................... B60L 58/12 |
| 2025/0004748 A1* | 1/2025 | Vemuri | ................ G06F 1/3296 |

* cited by examiner

101

101

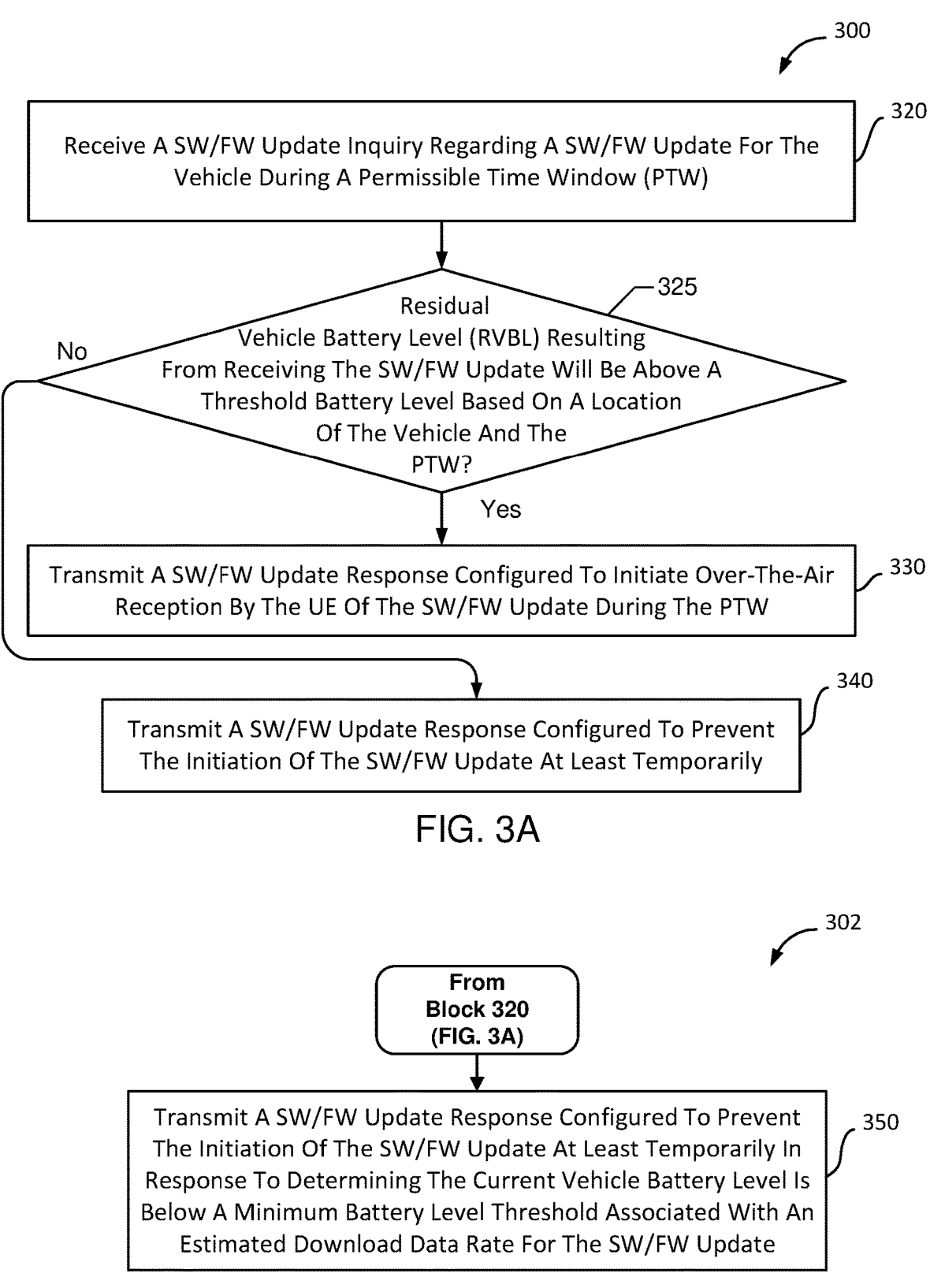

300

320

Receive A SW/FW Update Inquiry Regarding A SW/FW Update For The Vehicle During A Permissible Time Window (PTW)

325

Residual Vehicle Battery Level (RVBL) Resulting From Receiving The SW/FW Update Will Be Above A Threshold Battery Level Based On A Location Of The Vehicle And The PTW?

No

Yes

330

Transmit A SW/FW Update Response Configured To Initiate Over-The-Air Reception By The UE Of The SW/FW Update During The PTW

340

Transmit A SW/FW Update Response Configured To Prevent The Initiation Of The SW/FW Update At Least Temporarily

From Block 320 (FIG. 3A)

350

Transmit A SW/FW Update Response Configured To Prevent The Initiation Of The SW/FW Update At Least Temporarily In Response To Determining The Current Vehicle Battery Level Is Below A Minimum Battery Level Threshold Associated With An Estimated Download Data Rate For The SW/FW Update

FIG. 3B

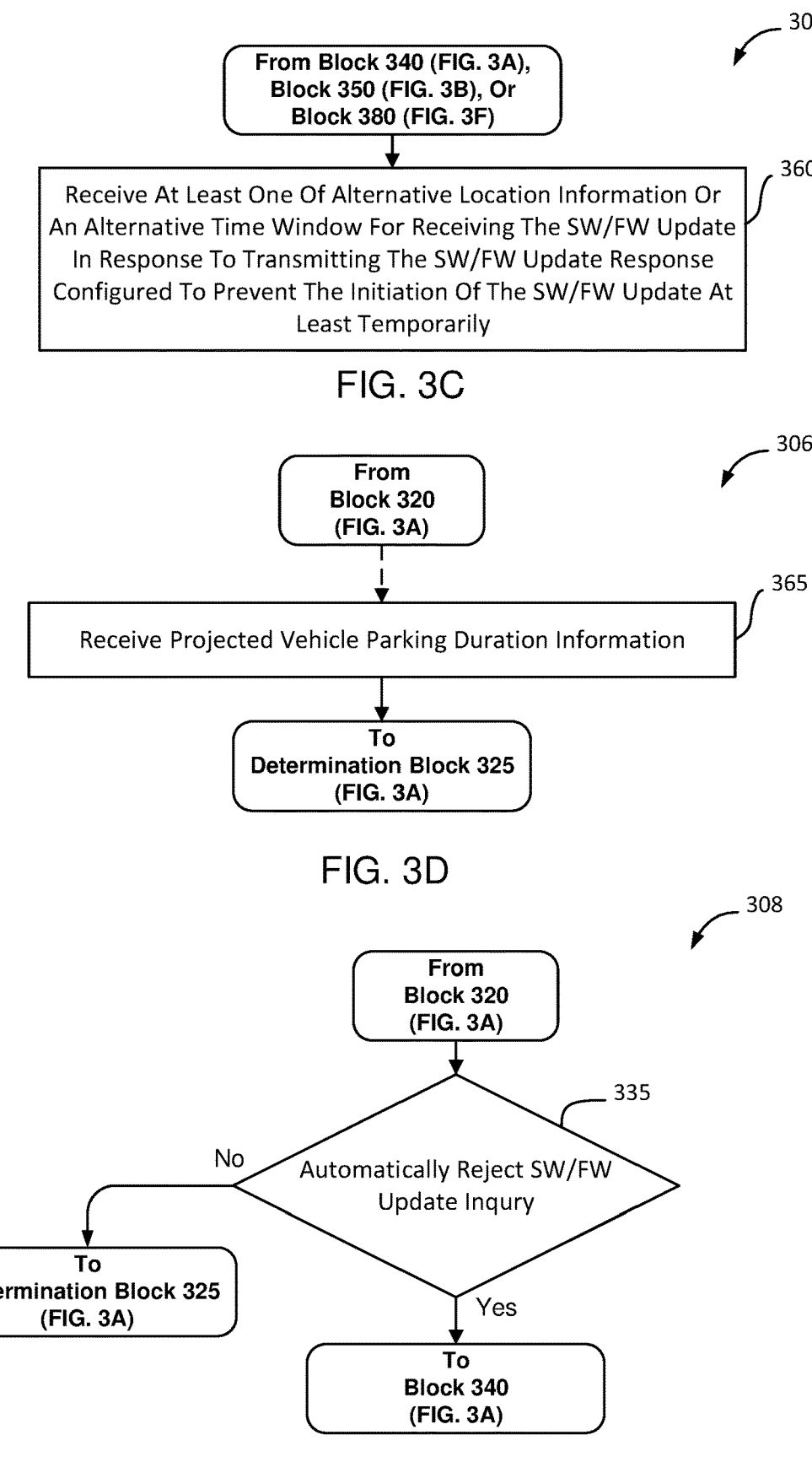

304

From Block 340 (FIG. 3A),
Block 350 (FIG. 3B), Or
Block 380 (FIG. 3F)

360

Receive At Least One Of Alternative Location Information Or
An Alternative Time Window For Receiving The SW/FW Update
In Response To Transmitting The SW/FW Update Response
Configured To Prevent The Initiation Of The SW/FW Update At
Least Temporarily

From
Block 320
(FIG. 3A)

365

Receive Projected Vehicle Parking Duration Information

To
Determination Block 325
(FIG. 3A)

From
Block 320
(FIG. 3A)

335

No          Automatically Reject SW/FW
Update Inqury

To
Determination Block 325
(FIG. 3A)

Yes

To
Block 340
(FIG. 3A)

FIG. 3E

| Description | Current UE Cell and Vehicle Parking Information | UE Cell and Frequent Vehicle Parking History/ Route Information | |
|---|---|---|---|
| | Current Location | Option A (Alternative Parking Location) | Option B (Alternative Route) |
| Current Location | Underground Parking | Home | Office to Home |
| Time Window | Now or past TW | $TW_A$ | $TW_B$ |
| CGI/PCI | CGI/PCI | $CGI_A/PCI_A$ | $CGI_B/PCI_B$ |
| UE Subscription/Carrier Info | SUB/Carrier | $SUB_A/Carrier_A$ | $SUB_B/Carrier_B$ |
| L-1 Measurements Average (e.g., RSRP) | avg(RSRP), avg(SNR) | $avg(RSRP)_A, avg(SNR)_A$ | $avg(RSRP)_B, avg(SNR)_B$ |
| NW-DRX-Config | NW-DRX-Config | $NW\text{-}DRX\text{-}Config_A$ | $NW\text{-}DRX\text{-}Config_B$ |
| ⋮ | ⋮ | ⋮ | ⋮ |
| ⋮ | ⋮ | ⋮ | ⋮ |

FIG. 4

CONTEXT AWARE VEHICLE OVER-THE-AIR (OTA) SOFTWARE/FIRMWARE (SW/FW) UPDATE

BACKGROUND

The growth of the software-defined vehicles market has emphasized the importance of a dependable implementation of over-the-air (OTA) software/firmware (SW/FW) updates for vehicle operations and critical applications. Many automotive original equipment manufacturers (OEMs) use a cellular network/mobile network operator (NW/MNO) as their preferred network option for deploying updates. However, when a vehicle is parked in locations where wireless signals are attenuated, such as underground garages, the diminished cellular coverage can negatively affect the successful reception of such software updates. This is often due to increased power consumption, more frequent random-access channel access attempt failures, and reduced download data rates.

SUMMARY

Various aspects include methods that may be implemented on a processor of a vehicle and systems for implementing the methods for performing a software/firmware (SW/FW) update on a processing system of a vehicle. Various aspects may include receiving, by a processing system, a SW/FW update inquiry regarding a SW/FW update with a permissible time window (PTW) for receiving and implementing the SW/FW update, predicting a residual vehicle battery level (RVBL) resulting from receiving and implementing the SW/FW update, wherein the RVBL is predicted from a current vehicle battery level less a battery drain associated with receiving and implementing the SW/FW update; and transmitting, by the processing system, a SW/FW update response configured to initiate over-the-air reception by the processing system of the SW/FW update during the PTW in response to predicting that the RVBL after receiving and implementing the SW/FW update will be above a threshold battery level based on a location of the vehicle and the PTW.

Some aspects may further include transmitting, by the processing system, a SW/FW update response configured to prevent initiation of the SW/FW update at least temporarily in response to predicting the current vehicle battery level is below a minimum battery level threshold associated with an estimated download data rate for the SW/FW update. receiving, by the processing system, at least one of alternative location information or an alternative time window for receiving and implementing the SW/FW update in response to transmitting the SW/FW update response configured to prevent initiation of the SW/FW update at least temporarily.

In some aspects, predicting the RVBL resulting from receiving and implementing the SW/FW update may account for at least one of size of the SW/FW update, a signal quality or a network configuration likely to be used for receiving and implementing the SW/FW update. In some aspects, In some aspects, predicting the RVBL resulting from receiving and implementing the SW/FW update may account for a prior amount of battery consumption associated with receiving a prior SW/FW update. In some aspects, predicting the RVBL resulting from receiving and implementing the SW/FW update may account for at least one of a vehicle specification specific to the vehicle, a battery specification of a battery of the vehicle, or processing specifications of the processing system of the vehicle.

In some aspects, the SW/FW update response may be configured to delay initiation of the SW/FW update in response to predicting that the RVBL resulting from receiving and implementing the SW/FW update will be above a lower residual vehicle battery threshold and below an upper residual vehicle battery threshold.

Some aspects may further include receiving, by the processing system, projected vehicle parking duration information, wherein predicting the RVBL resulting from receiving and implementing the SW/FW update accounts for the projected vehicle parking duration information.

In some aspects, the threshold battery level may include a low threshold and a high threshold such that at least one of an alternative location or alternative time window is established in response to predicting a RVBL resulting from receiving and implementing the SW/FW update will be between the low threshold and the high threshold. In some aspects, the SW/FW update inquiry may indicate at least one of a size of the SW/FW update or a priority of the update.

Some aspects may further include predicting the RVBL resulting from receiving and implementing the SW/FW update on each of two network subscriptions, selecting one of the two network subscriptions with a highest predicted RVBL to receive the SW/FW update in response to the predicted RVBL of both network subscriptions will be above the threshold battery level; and selecting one of the two network subscriptions with a predicted RVBL above the threshold battery level to receive the SW/FW update in response to only one predicted RVBL will be above the threshold battery level.

Further aspects include a vehicle system including a memory and a processor configured to perform operations of any of the methods summarized above. Further aspects may include a vehicle system having various means for performing functions corresponding to any of the methods summarized above. Further aspects may include a non-transitory processor-readable storage medium having stored thereon processor-executable instructions configured to cause a processor of a vehicle system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 3A is a process flow diagram of an example method for performing a SW/FW update on a processing system associated with a vehicle in accordance with various embodiments.

FIGS. 3B-3G are process flow diagrams of example operations that may be performed as part of the method for performing a SW/FW update on a processing system associated with a vehicle in accordance with various embodiments.

FIG. 4 is a table illustrating information for SW/FW updates over a cellular network in accordance with various embodiments.

DETAILED DESCRIPTION

Figure 1A:
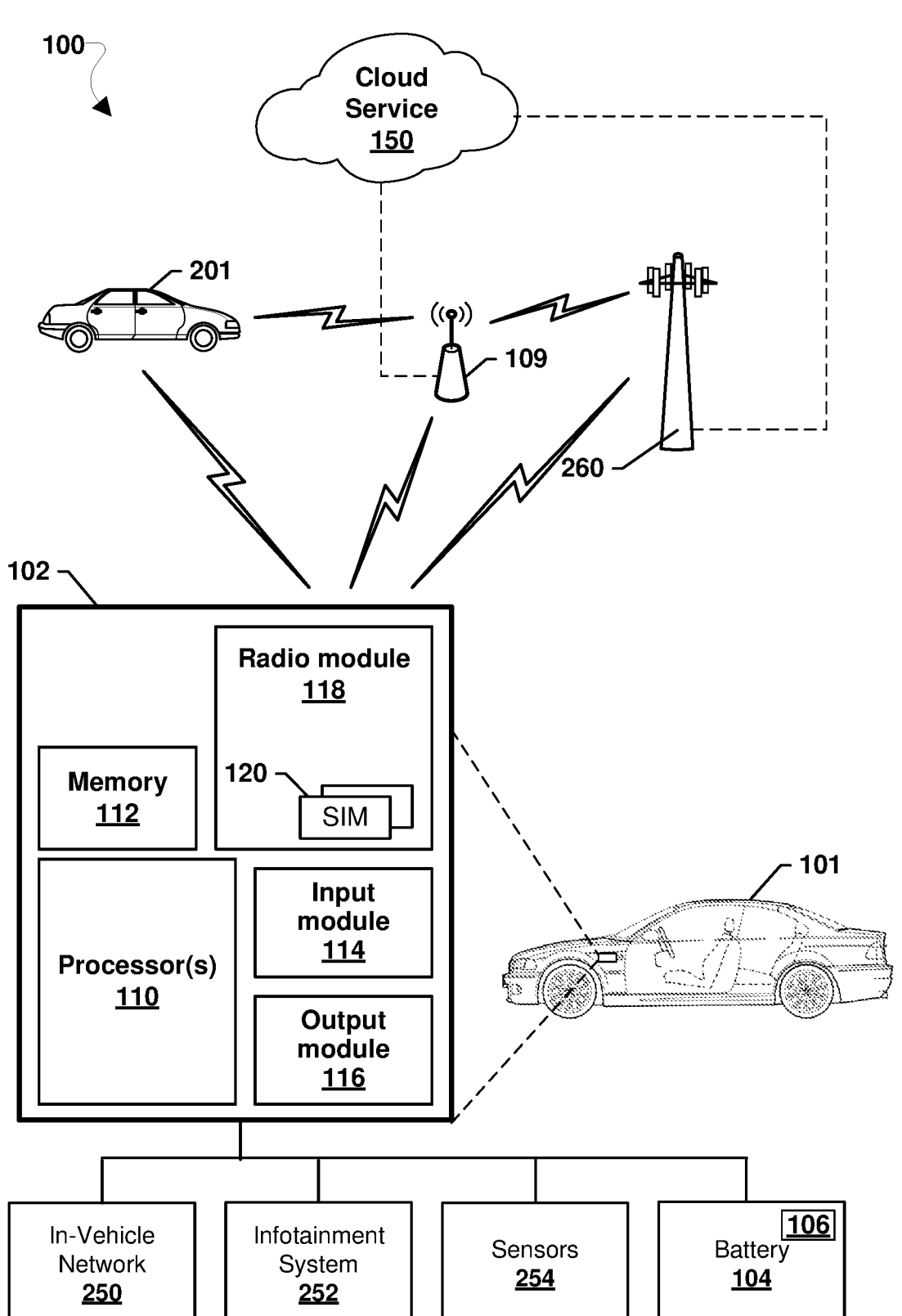
FIGS. 1A and 1B are component diagrams illustrating example system components suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include methods and vehicle systems for performing a SW/FW update on a processing system associated with a vehicle. Various embodiments may improve the operation of a vehicle by receiving, by the processing system, a SW/FW update inquiry regarding a SW/FW update for the vehicle during a permissible time window (PTW). In addition, the processing system may transmit a SW/FW update response configured to initiate the SW/FW update in response to predicting a residual vehicle battery level (RVBL) of the vehicle's battery resulting from receiving and implementing the SW/FW update will be above a threshold battery level based on a location of the vehicle and the PTW. The RVBL may be predicted based on a current vehicle battery level less a battery drain associated with receiving and implementing the SW/FW update.

In various embodiments, the processing system may transmit a SW/FW update response configured to delay or prevent initiation of the SW/FW update in response to predicting that a current vehicle battery level is below a minimum battery level needed for the processing system to predict whether the RVBL will be above the threshold battery level. Additionally or alternatively, the processing system may transmit a SW/FW update response configured to delay or prevent initiation of the SW/FW update in response to calculating that the RVBL will be below a threshold battery level. The RVBL correspond to an estimated battery level following receipt and implementation by the processing system of the SW/FW update.

Various embodiments may address the issue of unsuccessful software updates by using contextual awareness of the connectivity to a vehicle and the battery state of the vehicle before performing an OTA SW/FW update. For example, embodiments may make available and/or use network performance and predictive-QoS data, at the cellular/public land mobile network (PLMN) level. This information may enable OEMs to facilitate better OTA update scheduling for vehicles within specific coverage areas. Leveraging certain vehicle-specific data and conditions, which might not be fully known to the MNO, in conjunction with the information provided by the network can enhance update success, especially in areas of weak cellular coverage. Relevant data includes the remaining battery level when the vehicle is parked (e.g., remaining stationary for an extended period with the ignition off), the length of time the vehicle will remain parked, and a database detailing the vehicle's frequent routes, as well as travel and parking patterns.

Various embodiments enable a parked vehicle, when turned off, to predict the likelihood of successfully implementing an OTA SW/FW update at a particular parking spot within a set timeframe. This likelihood may be initially predicted by the processing system associated with a vehicle and further refined by a server maintained by or on behalf of an OEM. The prediction may hinge on the anticipated battery level of the vehicle's battery after the update is complete. Using this data, the OEM server or an OTA cloud service may determine whether the vehicle's current location, battery charge level, and other factors are suitable for the update.

The processing system may predict the battery power drain needed for completing the SW/FW update by examining either real-time or historical signal quality indicators at the vehicle's present location, the size of the pending update, and certain network settings. This prediction may be made through modeling, or an algorithm configured to individual vehicles, factoring in each vehicle's unique battery capacity, current battery level, and processing specifications. Such modeling and/or the algorithm may either be trained offline or loaded onto the processing system of the vehicle from the cloud. Various embodiments may adapt to situations in which the processing system has multiple network provider subscriptions.

In cases where the future residual vehicle battery is predicted to be below a threshold battery level, various embodiments may offer a mitigation strategy. For example, one mitigation strategy may involve the vehicle and the OEM server proposing alternative locations and timeframes for the SW/FW update. These alternatives may be determined using a database that tracks the vehicle's cellular performance history, the size of the pending update, and the current battery status before receiving the OTA update. Various embodiments my use specific battery level benchmarks, both low and high, after the update, and an "offset" value to evaluate other possible alternatives. Once these alternative options are identified, such alternative options may be transmitted to the processing system and/or a vehicle user mobile device for selection.

As used herein the term "software/firmware update" or "SW/FW update" are used interchangeably and refer to the process by which a piece of software or firmware on a device is replaced with a newer version. This process is commonly undertaken to fix bugs, improve performance, introduce new features, or enhance the existing functionalities of the software or firmware in question. While software generally pertains to applications and the user interface that individuals interact with, firmware is a specialized type of software embedded within hardware components to control and manage device functions. Both are useful for ensuring the optimal performance and security of devices, and regular updates ensure they remain current and effective in fulfilling their roles. As used herein, the expression a "SW/FW update inquiry" and a "SW/FW update response" refer to messages received and transmitted by a processing system that relate to SW/FW updates.

The terms "onboard" or "in-vehicle" are used herein interchangeably to refer to equipment or components contained within, attached to, and/or carried by a vehicle or device that provides a vehicle functionality. Onboard equipment typically includes a processing system that may include one or more processors, SOCs, and/or SIPs, any of which may include one or more components, systems, units, and/or modules that implement the functionality (collectively referred to herein as a "processing system" for conciseness). Aspects of onboard equipment and functionality may be implemented in hardware components, software components, or a combination of hardware and software components.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various embodiments.

FIG. 1A is a component diagram of an example communication system 100 suitable for implementing various embodiments. The communication system 100 may include a vehicle 101 that includes a processing system 102, for example, a telematics control unit or on-board unit (TCU/ OBU). The processing system 102 may be powered by the vehicle's battery 104 and communicate with various onboard systems and devices, such as an in-vehicle network 250, an infotainment system 252, various sensors 254 (e.g., equipment sensors, such as a battery level sensor 106, in-cabin sensors, external sensors, and/or driver monitoring sensors), and a radio frequency (RF) module 118, which may include one or more Subscriber Identity Modules 120 (SIM) for supporting communications with a wide-area cellular communication network. The processing system 102 may also communicate with one or more external systems and devices, such as communication units 109, other vehicles 201, base stations 260, and other external devices. Communication with the one or more external systems and devices may enable the processing system to communicate with an OEM through a cloud service 150, which may include a car-to-cloud (C2C) system.

Automotive OEMs have recognized the increasing importance of software and firmware updates in enhancing vehicle performance, adding new features, and fixing software bugs. This need has grown particularly with the rise of electric and autonomous vehicles. C2C allows vehicles through a processing system 102 to communicate either with each other or centralized servers. In terms of SW/FW updates, OEMs can diagnose a vehicle's software status remotely to determine if an update is necessary. With this capability, vehicles can receive OTA updates directly from the manufacturer's servers, eliminating the need for a physical visit to a dealership. Such SW/FW updates might only include the most recent changes, rather than re-downloading the entire software. Safety remains a priority, so many updates require user consent, especially if they significantly alter the vehicle's behavior. If a SW/FW update doesn't go as planned, there are measures in place to revert to a previous configuration. All communication is encrypted for security, protecting against potential threats. Once a SW/FW update is completed, the processing system 102 may relay the outcome back to the OEM's servers via the C2C. With permission, OEMs might gather post-update data to refine their software offerings.

In accordance with various embodiments, as part of delivering SW/FW updates, before doing so the OEM may transmit a SW/FW update inquiry to processing system's to ensure the update will be delivered and installed appropriately. The processing system 102 may be configured to receive and respond to the SW/FW update inquiries, applying contextual information to improve the likelihood that any SW/FW update will be successful.

In the example illustrated in FIG. 1A the processing system 102 includes one or more processors 110, memory 112, an input module 114, an output module 116 and a radio module 118, which may include one or more Subscriber Identity Modules 120 (SIM) for supporting communications with a wide-area cellular communication network. The one or more processors 110 may be configured with processor-executable instructions to control determinations regarding the prediction of future residual battery levels of the vehicle's battery 104 following receipt and implementation by the processing system of one or more the SW/FW updates, and/or other operations of the vehicle 101, including operations of various embodiments. The one or more processors 110 may be coupled to the memory 112. Also, the one or more processors 110 may be coupled to the output module 116, which may control in-vehicle displays or other user input systems for getting input from a vehicle occupant or other user managing vehicle SW/FW updates.

The processing system 102 may include a V2X antenna (e.g., an radio module 118), and may be configured to communicate with one or more external communication units 109, another vehicle 201, and/or the base station 260 or another suitable network access point. In various embodiments, the processing system 102 may receive information from a plurality of information sources, such as the in-vehicle network 250, infotainment system 252, various sensors 254 (e.g., driver monitoring sensors and/or other vehicle sensors), and the RF module 118.

The processing system 102 may be configured to prompt a vehicle operator or other user regarding alternative SW/FW update options in the event that vehicle battery levels of the vehicle's battery 104 are less than an acceptable threshold level, under current condition, to install a SW/FW update, as further described herein.

Examples of an in-vehicle network 250 include a Controller Area Network (CAN), a Local Interconnect Network (LIN), a network using the FlexRay protocol, a Media Oriented Systems Transport (MOST) network, and an Auto-motive Ethernet network. Examples of vehicle sensors 254 include a location determining system (such as a Global Navigation Satellite Systems (GNSS) system, a battery level sensor 106, a camera, radar, lidar, ultrasonic sensors, infra-red sensors, and other suitable sensor devices and systems.

Some embodiments may use information obtained through a vehicle communication system to obtain situ-ational information that may be useful in determining whether a SW/FW update should be installed. Such com-munication systems may exchange information through vehicle-to-vehicle (V2V), vehicle-to-infrastructure (V2I), vehicle-to-pedestrian (V2P), and/or vehicle-to-everything (V2X) communication protocols that may provide enhanced communication range and reliability. Additionally, the radio module 118 may include one or more SIMs 120 (i.e., single SIM or multi-SIM) and receive SW/FW updates via a wide-area cellular communication network using mobile broadband systems and technologies, such as third genera-tion wireless mobile communication technologies (3G) (e.g., global system for mobile communications (GSM) evolution (EDGE) systems, code division multiple access (CDMA) 2000 systems, etc.), fourth generation wireless mobile com-munication technologies (4G) (e.g., long term evolution (LTE) systems, LTE-Advanced systems, mobile Worldwide Interoperability for Microwave Access (mobile WiMAX) systems, etc.), fifth generation wireless mobile communica-tion technologies (5G NR systems, etc.), etc.

Figure 1B:
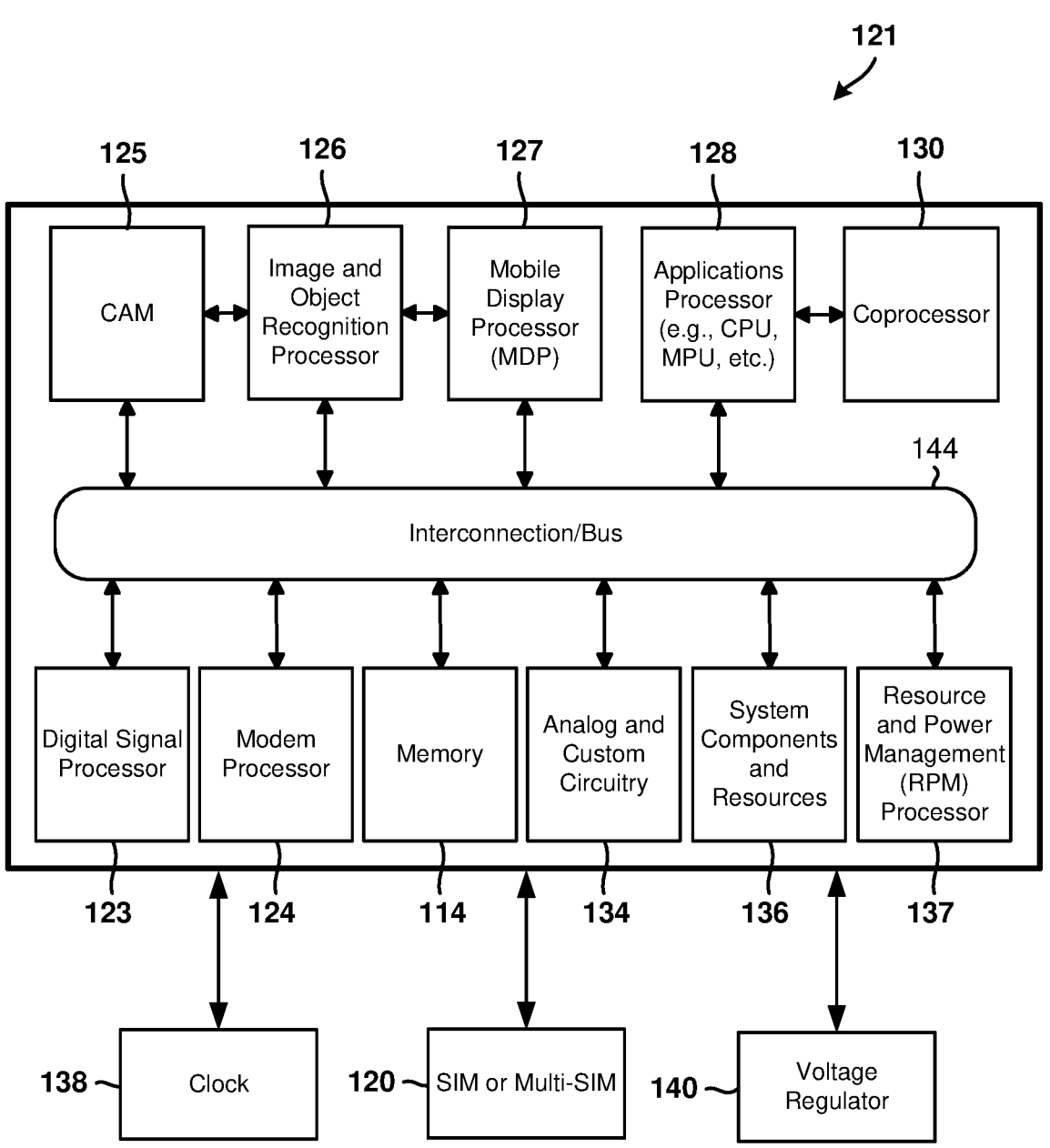

FIG. 1B is a block diagram illustrating example compo-nents of a system on chip (SOC) 121 suitable for use in a vehicle processing system in accordance with various embodiments. With reference to FIGS. 1A-1B, the process-ing device SOC 121 may include a number of heterogeneous processors, such as a digital signal processor (DSP) 123, a modem processor 124, an image and object recognition processor 126, a mobile display processor 127, an applica-tions processor 128, and a resource and power management (RPM) processor 137. The processing device SOC 121 may also include one or more coprocessors 130 (e.g., vector co-processor) connected to one or more of the heteroge-neous processors 123, 124, 126, 127, 128, 137.

Each of the processors may include one or more cores, and an independent/internal clock. Each processor/core may perform operations independent of the other processors/cores. For example, the processing device SOC 121 may include a processor that executes a first type of operating system (e.g., FreeBSD, LINUX, OS X, etc.) and a processor that executes a second type of operating system (e.g., Microsoft Windows). In some embodiments, the applica-tions processor 128 may be the SOC's 121 main processor, central processing unit (CPU), microprocessor unit (MPU), arithmetic logic unit (ALU), etc. The graphics processor 126 may be graphics processing unit (GPU).

The processing device SOC 121 may include analog circuitry and custom circuitry 134 for managing sensor data, analog-to-digital conversions, wireless data transmissions, and for performing other specialized operations, such as processing encoded audio and video signals for rendering in a web browser. The processing device SOC 121 may further include system components and resources 136, such as voltage regulators, oscillators, phase-locked loops, periph-eral bridges, data controllers, memory controllers, system controllers, access ports, timers, and other similar compo-nents used to support the processors and software clients (e.g., a web browser) running on a computing device.

The processing device SOC 121 also include specialized circuitry for camera actuation and management (CAM) 125 that includes, provides, controls and/or manages the opera-tions of one or more cameras (e.g., a primary camera, webcam, 3D camera, etc.), the video display data from camera firmware, image processing, video preprocessing, video front-end (VFE), in-line JPEG, high definition video codec, etc. The CAM 125 may be an independent processing unit and/or include an independent or internal clock.

In some embodiments, the image and object recognition processor 126 may be configured with processor-executable instructions and/or specialized hardware configured to per-form image processing and object recognition analyses involved in various embodiments. For example, the image and object recognition processor 126 may be configured to perform the operations of processing images received from cameras via the CAM 125 to recognize and/or identify other vehicles, and otherwise perform functions of the camera perception layer 224 as described. In some embodiments, the processor 126 may be configured to process radar or lidar data and perform functions of the radar and/or lidar percep-tion layer 222 as described.

The system components and resources 136, analog and custom circuitry 134, and/or CAM 125 may include cir-cuitry to interface with peripheral devices, such as cameras, radar, lidar, electronic displays, wireless communication devices, external memory chips, etc. The processors 123, 124, 126, 127, 128 may be interconnected to one or more memory elements 114, system components and resources 136, analog and custom circuitry 134, CAM 125, and RPM processor 137 via an interconnection/bus module 144, which may include an array of reconfigurable logic gates and/or implement a bus architecture (e.g., CoreConnect, AMBA, etc.). Communications may be provided by advanced inter-connects, such as high-performance networks-on chip (NoCs).

The processing device SOC 121 may further include an input/output module (not illustrated) for communicating with resources external to the SOC, such as a SIM 120 (or multi-SIM), a clock 138 and a voltage regulator 140. Resources external to the SOC (e.g., SIM 120, clock 138, voltage regulator 140) may be shared by two or more of the internal SOC processors/cores (e.g., a DSP 123, a modem processor 124, a graphics processor 126, an applications processor 128, etc.).

In some embodiments, the processing device SOC 121 may be included in a control unit (e.g., 140) for use in a vehicle (e.g., 101). The control unit may include communi-cation links for communications with a telephone network (e.g., 180), the Internet, and/or a network server (e.g., 184) as described.

The processing device SOC 121 may also include addi-tional hardware and/or software components that are suit-able for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi®, etc.), and other well-known components of modern electronic devices.

Figure 2A:
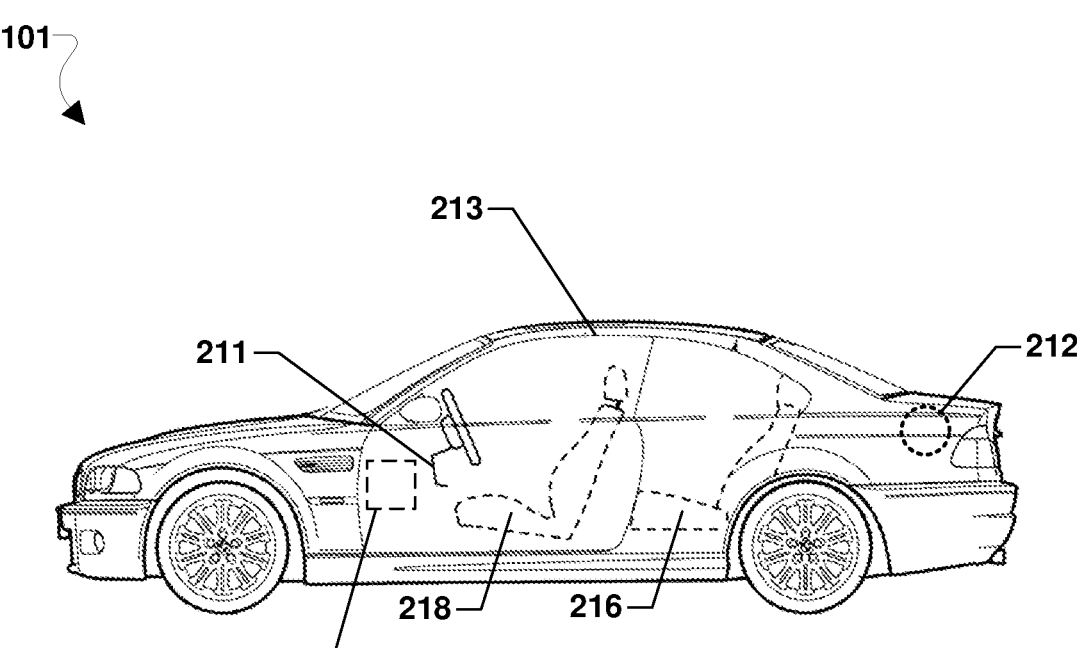
FIGS. 2A and 2B are component block diagrams illustrating a vehicle suitable for implementing various embodiments.
Figure 2B:
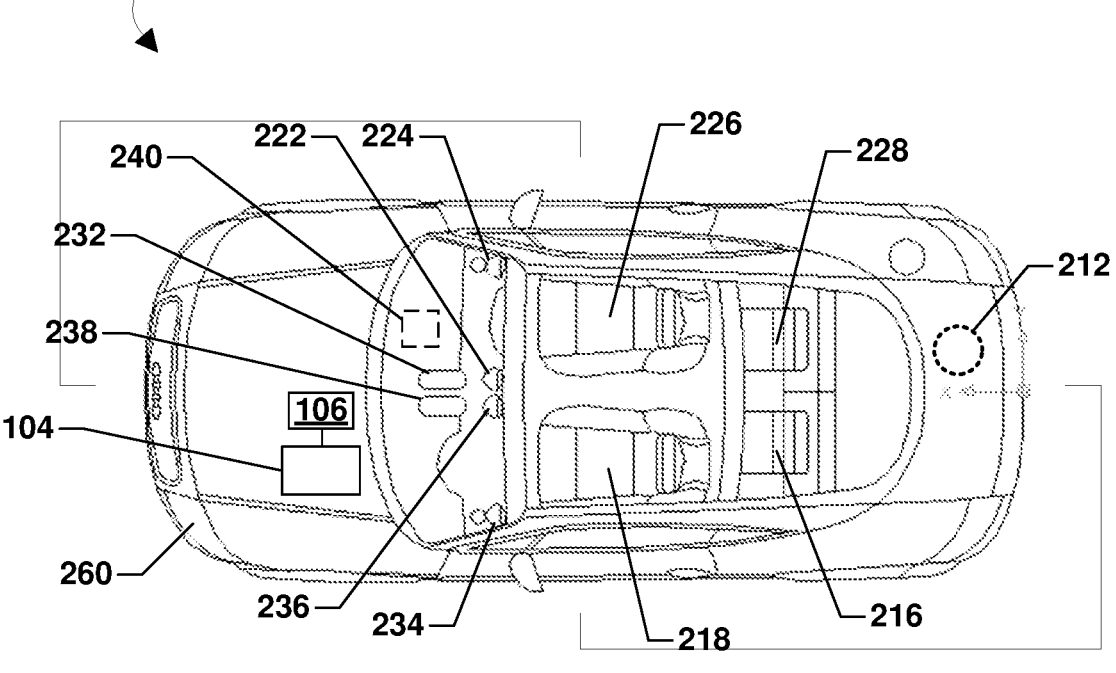

Various embodiments may be implemented within a variety of vehicles, an example vehicle 101 is illustrated in FIGS. 2A and 2B. With reference to FIGS. 1A-2B, the vehicle 101 may represent the subject vehicle 101 described above with regard to FIG. 1A. In various embodiments, the vehicle 101 may include a control unit 240 configured to receive situational information and driver state information, as well as present an alert to the driver using one or more select alert modalities. The control unit 240 may receive SW/FW update inquiries from an OEM server or other source, as well as situational information using on-board communication systems and sensors. In addition, the control unit 240 may be configured to transmit a response to the received SW/FW update under various circumstances.

In various embodiments, the control unit 240, which may include processing system (e.g., 102) and a plurality of sensors 211-238, including a battery level sensor 106, satellite geo-positioning system receivers 213, occupancy and in-cabin sensors 212, 216, 218, 226, 228, cameras 222, 236, microphones 224, 234, radar 232, and lidar 238. The plurality of sensors 211-238, disposed in or on the vehicle, may be used for various purposes, such as autonomous and semi-autonomous navigation and control, crash avoidance, position determination, etc., as well to provide sensor data regarding objects and people in or on the vehicle 101. The sensors 211-238 may include one or more of a wide variety of sensors capable of detecting a variety of information useful for recognizing and detecting movement and/or parking patterns of a vehicle. Each of the sensors 211-238 may be in wired or wireless communication with the control unit 240, as well as with each other. In particular, the sensors may include one or more cameras 222, 236 or other optical sensors or photo optic sensors. The sensors may further include other types of object detection and ranging sensors, such as radar 232, lidar 238, IR sensors, and ultrasonic sensors. The sensors may further include satellite geo-positioning system sensors 213, control input sensors 211, a battery level sensor 106 for predicting the charge state of the vehicle's battery 104, accelerometers, vibration sensors, gyroscopes, gravimeters, force meters, stress meters, strain sensors, fluid sensors, chemical sensors, gas content analyzers, pH sensors, radiation sensors, biological material sensors, microphones 224, 234, occupancy sensors 212, 216, 218, 226, 228, proximity sensors, and other sensors.

The vehicle control unit 240 may include a computing device that is configured with processor-executable instructions to perform battery level assessments of the vehicle's battery 104 related to SW/FW updates and operations using information received from various sensors, particularly the battery level sensor 106. In some embodiments, the control unit 240 may supplement the processing of camera images using distance and relative position (e.g., relative bearing angle) that may be obtained from radar 232 and/or lidar 238 sensors.

Vehicles may have vehicle infotainment systems that have displays configured to prompt users (i.e., vehicle occupants) regarding SW/FW updates. Additionally, a driver's smart phone or other mobile device may be linked to the vehicle and/or the processing system and used to prompt a user.

FIG. 3A is a process flow diagram of an example method 300 for performing a software/firmware (SW/FW) update on a processing system associated with a vehicle in accordance with various embodiments. With reference to FIGS. 1-3A, the operations of the method 300 may be performed by a vehicle processing system (e.g., 102, 121, 240) including one or more processors (e.g., 110, 123, 124, 126, 127, 128, 130) and/or hardware elements, any one or combination of which may be configured to perform any of the operations of the method 300. Further, one or more processors within the processing system may be configured with software or firmware to perform various operations of the method. To encompass any of the processor(s), hardware elements and software elements that may be involved in performing the method 300, the elements performing method operations are referred to generally as a "processing system." Further, means for performing functions of the method 300 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

In block 320, the processing system may receive a SW/FW update inquiry regarding a SW/FW update for the vehicle during a permissible time window (PTW). For example, the processing system may receive the SW/FW update inquiry, in the form of a message from an OEM server or other entity that provides SW/FW updates. The SW/FW update inquiry may be configured to interrogate the processing system about whether conditions are appropriate for performing a SW/FW update. The SW/FW update inquiry may include metadata usable by the processing system to determine whether the SW/FW update should be performed. The metadata may provide information about the size and/or priority of the proposed SW/FW update and/or details about the PTW. The PTW, which reflects one or more windows of time during which the SW/FW update may be received OTA by the processing system. The PTW may extend from the present into the future or start in the future. Also, the PTW may be one continuous span of time, or more than one period spaced apart.

The processing system may be configured to receive SW/FW update inquiries only under certain conditions, such as when the vehicle is parked, the vehicle ignition is off, the processing system is camped on a cell and in radio resource control (RRC)-idle state, the processing system has access to the vehicle battery level/status information, and the processing system has access to processing system cell/signal quality information (historical and/or current). Examples of relevant types of processing system cell/signal quality information may include repeated radio-link-failure (RLF) detection, jamming detection, a random access channel (RACH) attempt failure rate, etc. Also, examples of processing system cell/signal quality information may include previous recognized parking or OTA SW/FW update locations (e.g., home, office, etc.), regular trips (e.g., home-to-work, work-to-home, home-to-gym, etc.) and/or particular time windows (e.g., morning, night, specific time intervals, etc.). Examples of relevant processing system cell/signal quality information may include Reference Signal Received Power (RSRP), Reference Signal Received Quality (RSRQ), and signal-to-noise ratio (SNR), etc.

In determination block 325, the processing system may predict whether the RVBL resulting from receiving and implementing the SW/FW update will be above a threshold battery level based on a location of the vehicle and the PTW. The RVBL may be predicted from a current vehicle battery level less an expected battery drain associated with receiving and implementing the SW/FW update.

In various embodiments, predicting the RVBL resulting from receiving and implementing the SW/FW update may predict an estimate of how much battery power will remain available to the processing system and/or the vehicle after the SW/FW update is performed (i.e., following receipt and installation by the processing system of the SW/FW update). The prediction or estimation of the RVBL may use a cost function that models the total processing system power consumption to equal the processing system power usage during an RRC connection setup, Data ON/RRC-Connected state, discontinuous reception (DRX) inactivity timer, and a connected mode DRX (C-DRX) period until the network releases the RRC connection. Alternatively, or additionally, the cost function may model the processing system power usage by accounting for the power consumed in calculating the predicted RVBL.

To predict the RVBL resulting from receiving and implementing the SW/FW update, in addition to considering the size of the SW/FW update, the processing system may account for at least one of a signal quality or a network configuration likely to be used for receiving and implementing the SW/FW update. Using signal quality information (e.g., L1-measurement logs in the Idle mode) over a recent period of time (e.g., the past 10 seconds) and UE cell history information (e.g., RRC configuration), the processing system may determine an estimate of the download (DL) data rate (e.g., an upper bound). Alternatively, or additionally, the processing system may estimate the (upper bound on) DL data rate based on data from a processing system cell history database (e.g., using history of CGI/PCI, avg(RSRP) and network configuration) for the current location. In this way, the processing system may estimate the minimum time span required to perform the SW/FW update based on the estimated/predicted DL data rate and the size of the SW/FW update.

The signal quality in the context of software updates often hinges on factors such as the average reference signal received power (RSRP) or the average signal-to-noise ratio (SNR). Based on the predicted download data rate and the size of the SW/FW update to download, it's possible to estimate the minimum time span needed to carry out the SW/FW update. However, if the radio frequency (RF) conditions are deemed poor, and the RVBL is nearing a critical threshold, the processing system might determine that it is not in an optimal state to calculate a reliable success score for the SW/FW update. In such situations, the processing system may communicate with the OEM server to request a postponement of the SW/FW update procedure without suggesting alternate solutions, anticipating that the likelihood of successfully updating the SW/FW might be low given the current conditions.

For example, when the processing system encounters poor RF signal conditions, which result in low download data rates, the device would need to remain in an RRC-Connected state for a longer duration to fully receive the SW/FW update download. This extended connection time can lead to the processing system consuming more power. Coupled with the RVBL, this means that the chances of successfully updating the software under such conditions might be reduced. Conversely, processing systems that find themselves in favorable RF conditions can typically complete their SW/FW update downloads more swiftly. This means they won't need to stay connected for as long, leading to a reduction in power usage. Naturally, when considering the RVBL in these more favorable conditions, the chances of a successful SW/FW update tend to be higher.

In some embodiments, the predicted RVBL resulting from receiving and implementing the SW/FW update may account for a prior amount of battery power drain associated with receiving and implementing a prior SW/FW update. Additionally or alternatively, the predicted RVBL resulting from receiving and implementing the SW/FW update may account for at least one of a vehicle specification specific to the vehicle, a battery specification of a battery of the vehicle, or processing specifications of the processing system of the vehicle.

In response to predicting that the RVBL resulting from receiving and implementing the SW/FW update will be above a threshold battery level based on a location of the vehicle and the PTW (i.e., determination block 325="Yes"), the processing system may transmit a SW/FW update response configured to initiate over-the-air reception by the processing system of the SW/FW update during the PTW in block 330.

In response to predicting the RVBL resulting from receiving and implementing the SW/FW update will be below or equal to a threshold battery level based on a location of the vehicle and the PTW (i.e., determination block 325="No"), the processing system may transmit a SW/FW update response configured to prevent initiation of the SW/FW update at least temporarily in block 340. The processing system may transmit a SW/FW update response configured to prevent initiation of the SW/FW update at least temporarily in response to predicting a RVBL resulting from receiving and implementing the SW/FW update will not be above a threshold battery level based on a location of the vehicle and the PTW in determination block 325. Although the SW/FW update response may be configured to indefinitely prevent the SW/FW update, alternatively the SW/FW update may be configured to delay initiation of the SW/FW update in response predicting the RVBL resulting from receiving and implementing the SW/FW update will be above a lower residual vehicle battery threshold and below an upper residual vehicle battery threshold. The delay may allow the vehicle to relocate to another more favorable location and/or time window.

FIG. 3B is a process flow diagram of example operations 302 including block 350 that may be performed as part of the method 300 for performing a SW/FW update on a processing system associated with a vehicle in accordance with various embodiments. With reference to FIGS. 1A-3B, the operations of block 350 may be performed by a vehicle processing system (e.g., 102, 121, 240) including one or more processors (e.g., 110, 123, 124, 126, 127, 128, 130) and/or hardware elements, any one or combination of which may be configured to perform any of the operations of block 350. Further, one or more processors within the processing system may be configured with software or firmware to perform various operations of block 350. To encompass any of the processor(s), hardware elements and software elements that may be involved in performing the block 350, the elements performing method operations are referred to generally as a "processing system." Further, means for performing functions of block 350 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

After receiving and implementing the SW/FW update inquiry regarding the SW/FW update for the vehicle during the (PTW) in block 320 of the method 300, the processing system may transmit a SW/FW update response configured to prevent initiation of the SW/FW update at least temporarily in response to predicting the current vehicle battery level is below a minimum battery level threshold associated with an estimated download data rate for the SW/FW update in block 350. For example, a predetermined minimum battery level threshold may be a predetermined percentage (e.g., 5%, 10%, or 15%) of the total battery level, and if the current vehicle battery level is below that predetermined percentage, the processing system, using the radio module, may transmit the SW/FW update response configured to prevent initiation of the SW/FW update at least temporarily.

FIG. 3C is a process flow diagram of example operations 304 including block 360 that may be performed as part of the method 300 and/or operations 302 or 310 for performing a SW/FW update on a processing system associated with a vehicle in accordance with various embodiments. With reference to FIGS. 1A-3C, the operations of block 350 may be performed by a vehicle processing system (e.g., 102, 121, 240) including one or more processors (e.g., 110, 123, 124, 126, 127, 128, 130) and/or hardware elements, any one or combination of which may be configured to perform any of the operations of block 360. Further, one or more processors within the processing system may be configured with software or firmware to perform various operations of block 360. To encompass any of the processor(s), hardware elements and software elements that may be involved in performing the operations of block 360, the elements performing method operations are referred to generally as a "processing system." Further, means for performing functions of block 360 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

In various embodiments, an OEM server or similar entity may determine one or more alternative locations for delivering the SW/FW update to the processing system within either the PTW or an alternative PTW. The OEM may send alternative location information to the processing system and/or to a vehicle user (e.g., via a mobile device) to select which alternative location would work, if any.

The OEM server may determine alternate locations for the SW/FW update delivery based on the vehicle parking history/routine. For example, although the vehicle is currently parked near the user's office location, at night the vehicle is typically parked in a home garage, which may be a more suitable location. In determining alternative locations for the SW/FW update, the OEM server may consider processing system cell history for the location(s) over different time window(s), the update priority, and the size of SW/FW download. Thus, the OEM may transmit, to the processing system, alternative location information and/or one or more alternative time windows for scheduling of the SW/FW update. The OEM server may transmit the alternative location information and/or the alternative time window(s) to the processing system. Additionally or alternatively, the OEM server may transmit a notification to the vehicle user's mobile device to select the preferred option(s). In this way, the processing system and/or the vehicle user may have options for where and when the update will occur or be able to respond to the OEM server with one or more preferences.

For example, based on the vehicle/user's travel patterns (e.g., home to office between 8-9 AM, office to home between 5-6 pm, etc.), the OEM server may use the statistics of processing system cell performance history during that trave, the update priority, and the size of a software (SW) download to determine at least one alternative location and/or at least one alternative time window for scheduling the software and/or firmware (SW/FW) update. The OEM server may then send a notification to the processing system and/or the user mobile device to select the preferred scheduling options. In some embodiments, the processing system may be programmed with preferences in order to be able to respond to receipt of alternative location information and/or alternative time windows with a selection of preferred options.

After transmitting the SW/FW update response configured to prevent initiation of the SW/FW update at least temporarily in block 320 of the method 300 or block 350 of operations 302; or after transmitting the SW/FW update response configured to initiate another SW/FW update inquiry when the vehicle is at or near other available location(s) in block 370 of the operations 310, the processing system may receive at least one of alternative location information or an alternative time window for receiving and implementing the SW/FW update in response to transmitting the SW/FW update response configured to prevent initiation of the SW/FW update at least temporarily in block 360. In accordance with various embodiments, the processing system may respond by transmitting, to an OEM server, a SW/FW update response acknowledging or selection options if alternatives were included in the received at least one of alternative location information or an alternative time window for receiving and implementing the SW/FW update.

FIG. 3D is a process flow diagram of example operations 306 including block 365 that may be performed as part of the method 300 for performing a SW/FW update on a processing system associated with a vehicle in accordance with various embodiments. With reference to FIGS. 1A-3D, the operations of block 365 may be performed by a vehicle processing system (e.g., 102, 121, 240) including one or more processors (e.g., 110, 123, 124, 126, 127, 128, 130) and/or hardware elements, any one or combination of which may be configured to perform any of the operations of block 365. Further, one or more processors within the processing system may be configured with software or firmware to perform various operations of block 365. To encompass any of the processor(s), hardware elements and software elements that may be involved in performing the operations of block 365, the elements performing method operations are referred to generally as a "processing system." Further, means for performing functions of block 365 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

Before or after receiving and implementing the SW/FW update inquiry regarding the SW/FW update for the vehicle during the PTW in block 320 of the method 300, the processing system may receive projected vehicle parking duration information in block 365. For example, in block 365, the processing system may receive projected vehicle parking information. Such projected vehicle parking information may be used in determination block 325 of the method 300 to predict the RVBL.

FIG. 3E is a process flow diagram of example operations 308 including determination block 335 that may be performed as part of the method 300 for performing a SW/FW update on a processing system associated with a vehicle in accordance with various embodiments. With reference to FIGS. 1A-3E, the operations of determination block 335 may be performed by a vehicle processing system (e.g., 102, 121, 240) including one or more processors (e.g., 110, 123, 124, 126, 127, 128, 130) and/or hardware elements, any one or combination of which may be configured to perform any of the operations of determination block 335. Further, one or more processors within the processing system may be configured with software or firmware to perform various operations of determination block 335. To encompass any of the processor(s), hardware elements and software elements that may be involved in performing the operations of determination block 335, the elements performing method operations are referred to generally as a "processing system." Further, means for performing functions of determination block 335 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

After receiving and implementing the SW/FW update inquiry regarding the SW/FW update for the vehicle during the PTW in block 320 of the method 300, the processing system may determine whether the SW/FW update inquiry should be automatically rejected in determination block 335. In various embodiments, the processing system may be configured under certain conditions to automatically reject or ignore SW/FW update inquiries, particularly when it may not be suitable for the processing system to receive SW/FW updates or SW/FW update inquires.

For example, it may not be suitable for the processing system to receive SW/FW updates or SW/FW update inquires if the vehicle is not parked, the vehicle ignition is not off, the processing system is not camped on a cell and in radio resource control (RRC)-idle state, the processing system does not have access to the vehicle battery level/status information, and/or the processing system does not have access to processing system cell/signal quality information (historical and/or current). Without receiving an acknowledgement of a SW/FW update inquiry (e.g., if the processing system ignores or does not receive the SW/FW update inquiry), the OEM server or other entity that provides SW/FW updates may assume the processing system is not prepared to receive a SF/FW update, at least at this time.

In response to determining that the SW/FW update inquiry should be automatically rejected (i.e., determination block 335="Yes"), the processing system may perform the operations in block 340 in the method 300 to transmit the SW/FW update response configured to prevent initiation of the SW/FW update at least temporarily as described.

In response to determining that the SW/FW update inquiry should not be automatically rejected (i.e., determination block 335="No"), the processing system may determine whether the RVBL resulting from receiving and implementing the SW/FW update will be above a threshold battery level based on the location of the vehicle and the PTW in determination block 325 in the method 300 as described.

In various embodiments, the processing system may be configured under certain conditions to automatically acknowledge and immediately accept SW/FW update inquiries without even checking the battery level status, such as when the processing system is being charged and/or supplied power for an extended period.

Figure 3F:
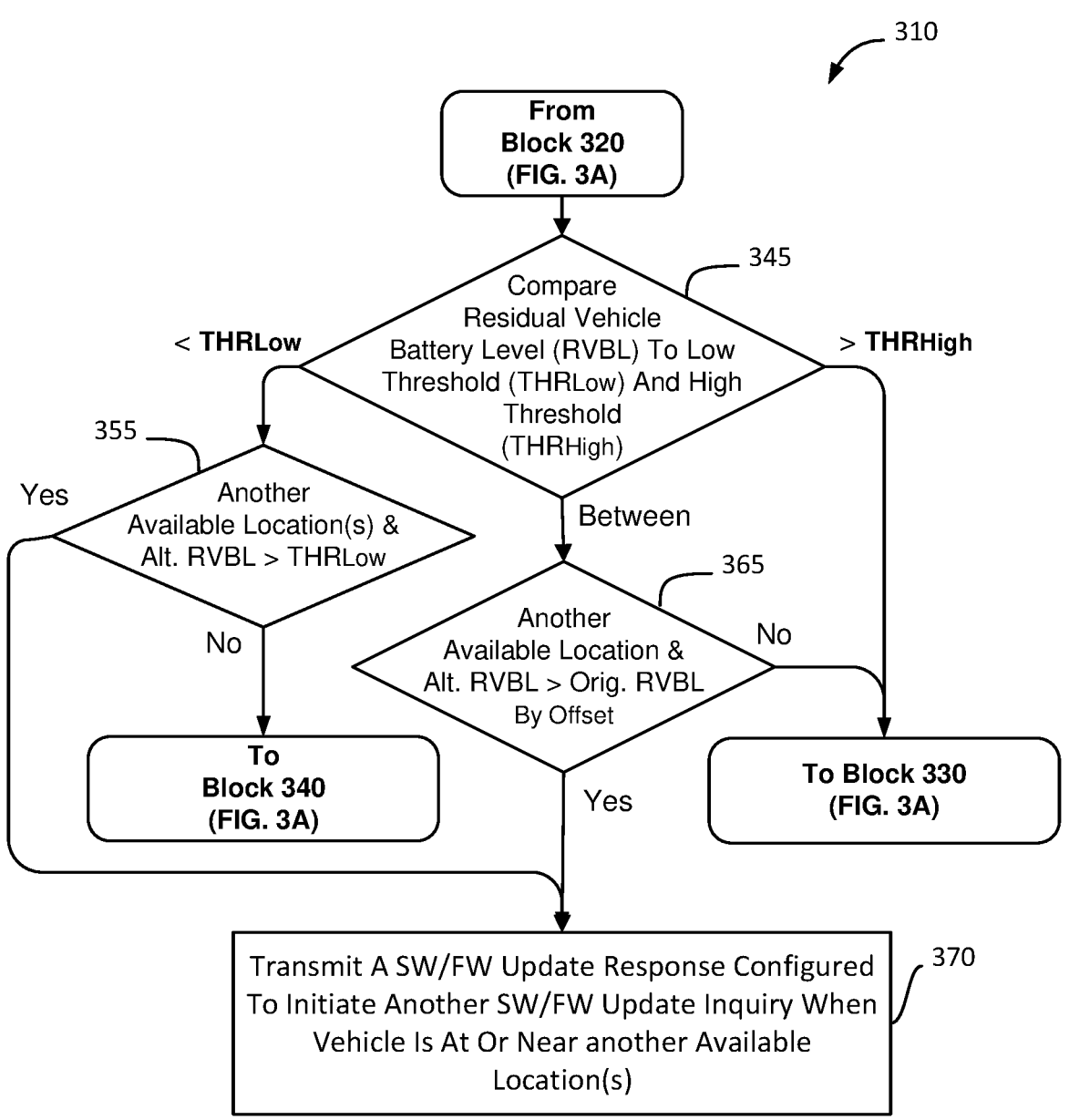

FIG. 3F is a process flow diagram of example operations 310 that may be performed as part of the method 300 for performing a SW/FW update on a processing system associated with a vehicle in accordance with various embodiments. With reference to FIGS. 1A-3F, the operations 310 may be performed by a vehicle processing system (e.g., 102, 121, 240) including one or more processors (e.g., 110, 123, 124, 126, 127, 128, 130) and/or hardware elements, any one or combination of which may be configured to perform any of the operations of the operations 310. Further, one or more processors within the processing system may be configured with software or firmware to perform various operations of operations 310. To encompass any of the processor(s), hardware elements and software elements that may be involved in performing the operations 310, the elements performing method operations are referred to generally as a "processing system." Further, means for performing functions of operations 310 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

After receiving and implementing the SW/FW update inquiry regarding the SW/FW update for the vehicle during the PTW in block 320 of the method 300, the processing system may compare the RVBL to a low threshold ($THR_{Low}$) and a high threshold ($THR_{High}$) in determination block 345. In this way, rather than working with a single RVBL threshold, various embodiments may use more than one threshold and respond to conditions accordingly. For example, in determination block 345, by using a low threshold ($THR_{Low}$) and a high threshold ($THR_{High}$), the processing system may compare the predicted RVBL to see whether that RVBL is below the low threshold ($<THR_{Low}$), above the high threshold ($>THR_{High}$), or somewhere between the low threshold ($THR_{Low}$) and the high threshold ($THR_{High}$), which may include both thresholds ($THR_{Low}$, $THR_{High}$). Alternatively, a less than or equal to comparison may be made with the low threshold ($\leq THR_{Low}$) or the high threshold ($\geq THR_{High}$) with the in between results not including the low threshold ($THR_{Low}$) or the high threshold ($THR_{High}$).

In response to predicting that the RVBL is below the low threshold (i.e., determination block 345="$<THR_{Low}$"), the processing system may determine whether another location is available for the vehicle to receive the SW/FW update and whether an alternative RVBL corresponding to any identified other available location is greater than the low threshold (i.e., Other Available Location(s) & Alt. RVBL>$THR_{Low}$) in determination block 355. Any available one or more locations that also have an alternative RVBL that is greater than the low threshold ($THR_{Low}$) may be suitable locations to propose for where the SW/FW update may be downloaded to the processing system. Otherwise, if no other location is available or at least no other location that will provide an Alternative RVBL above the low threshold, the processing system should transmit a SW/FW update response configured to prevent initiation of the SW/FW update at least temporarily.

In response to predicting that the RVBL is above the high threshold (i.e., determination block 345="$>THR_{High}$"), the processing system may transmit a SW/FW update response configured to initiate over-the-air reception by the processing system of the SW/FW update during the PTW in block 330 of the method 300 as described.

In in response to predicting that the RVBL is between the low threshold and the high threshold (i.e., determination block 345="Between"), the processing system may determine whether another location is not only available for the vehicle to receive the SW/FW update, but also provides an alternative RVBL that is greater than the original RVBL by more than a predetermined offset (i.e., Other Available Location & Alt. RVBL>Orig. RVBL by Offset) in determination block 365. For example, for short-term parking scenarios, the threshold values can be adjusted by using lenient offsets. In contrast, for long-term parking situations, the threshold requirements may use more stringent offsets.

In response to determining at least one other available location exists for downloading the SW/FW update and an alternative RVBL for that other available location is above the low threshold (i.e., determination block 355="Yes"), the processing system may transmit a SW/FW update response configured to initiate another SW/FW update inquiry when the vehicle is at or near the other available location in block 370.

In response to determining that no other available location exists for downloading the SW/FW update, particularly one that provides an alternative RVBL that is above the low threshold (i.e., determination block 355="No"), the processing system may transmit a SW/FW update response configured to prevent initiation of the SW/FW update at least temporarily (i.e., proceed to the operations in block 340 of the method 300).

In response to determining that another available location is not only available for the vehicle to receive the SW/FW update, but also provides an alternative RVBL that is greater than the original RVBL by more than a predetermined offset (i.e., determination block 365="Yes"), the processing system may transmit a SW/FW update response configured to initiate another SW/FW update inquiry when the vehicle is at or near the other available location in block 370. For example, any available one or more locations that also have an Alternative RVBL that is greater than the original RVBL by more than a predetermined amount (e.g., 5%) may be suitable locations to propose for where the SW/FW update to be downloaded to the processing system.

Otherwise, if no other location is available or at least no other location that will provide an alternative RVBL above the original RVBL by more than the offset, the processing system may transmit a SW/FW update response configured to initiate the OTA reception by the processing system of the SW/FW update during the PTW. Thus, in response to determining that no other location is available for the vehicle to receive the SW/FW update, or at least one that provides an alternative RVBL that is greater than the original RVBL by more than a predetermined offset (i.e., determination block 365="No"), the processing system may transmit a SW/FW update response configured to initiate over-the-air reception by the processing system of the SW/FW update during the PTW in block 330 of the method 300 as described.

In block 370, the processing system may transmit a SW/FW update response configured to initiate another SW/FW update inquiry when the vehicle is at or near the other available location. In addition, if appropriate, if more than one other location was identified that is available for the vehicle to receive the SW/FW update, then a user may be given the option to either select a suitable location or reject all available locations.

As described, the vehicle processing system radio module 118 may include one or more SIMs 120 for supporting wireless communications with a cellular wide-area wireless network, including receiving SW/FM updates over-the-air. In vehicle processing systems equipped with two (or more) SIMs (i.e., multi-SIM radio modules) supporting two wireless network subscriptions with different network providers, some implementations enable both network subscriptions to be used simultaneously for Internet data services, which is referred to as a dual-SIM dual active (DSDA) mode.

In some embodiments, a processing system configured to communicate with an SW/FW provider using the multi-SIM radio module with DSDA capability may predict the RVBL for receiving the SW/FW update for all possible options over two SIMs/subscriptions which are SIM/subscription-1, SIM/subscription-2 and both SIMs/subscriptions (DSDA mode). The processing system may follow the same procedure as described above to predict the RVBL for each individual SIM/subscription. The processing system to predict the RVBL for receiving SW/FW update in DSDA mode may consider signal quality information (e.g., L-1 measurement logs in the idle mode) for both SIMs/subscriptions, history of network configurations for both SIMs/subscriptions (e.g., C-DRX parameters for network provider of each SIM/subscription) and history of UE configuration in DSDA mode (e.g., configured components carriers and MIMO layers across two SIMs/subscriptions which might be lower for each SIM/subscription compared with single-SIM radio module or multi-SIM radio module with only DSDS mode capability as two SIMs/subscriptions may share radio resources). The processing system then may determine for which options the predicted RVBLs are above the minimum threshold. If the processing system predicts that the RVBL for DSDA mode will be above the minimum threshold, the SW/FW provider may select both SIMs/subscriptions for receiving SW/FW update. If the processing system predicts the RVBL for each individual SIM/subscription will be above the minimum threshold (but not for the DSDA mode), the processing system may select the SIM supporting the network subscription with the higher RVBL to use for receiving the SW/FW update. Otherwise, the processing system may select the SIM supporting the network subscription with an acceptable predicted RVBL, that is a predicted RVBL above the minimum threshold. If neither subscription has an acceptable predicted RVBL the SW/FW update may be prevented at least temporarily.

In some implementations in which multi-SIM radio modules support two (or more) wireless network subscriptions with different network providers, only one subscription/network can be used for long duration Internet data services (e.g., receiving over-the-air SW/FW updates), which is referred to as a dual-SIM dual-standby (DSDS) mode. In some embodiments, a processing system configured to communicate with an SW/FW provider using the DSDS mode may predict the RVBL for receiving SW/FW updates for both subscriptions/SIMs, and verify whether RVBLs for each subscription/network are above the minimum threshold or not. If the processing system predicts the RVBL for both SIMs/subscriptions are above the minimum threshold, then the processing system may use the subscription/network with the higher RVBL for receiving the SW/FW update. If the subscription/network with the higher predicted RVBL is not currently selected as the subscription for receiving Internet data services, the processing system may trigger switching the subscriptions so that the SW/FW update can be received using the subscription/network with the higher predicted RVBL. If the processing system predicts the RVBL for both subscriptions/networks are above the minimum threshold, then the processing system may use the subscription/network with the acceptable RVBL for receiving the SW/FW update, switching the subscription/network used for receiving Internet data services if necessary. If neither network subscription has an acceptable predicted RVBL the SW/FW update may be prevented at least temporarily.

Figure 3G:
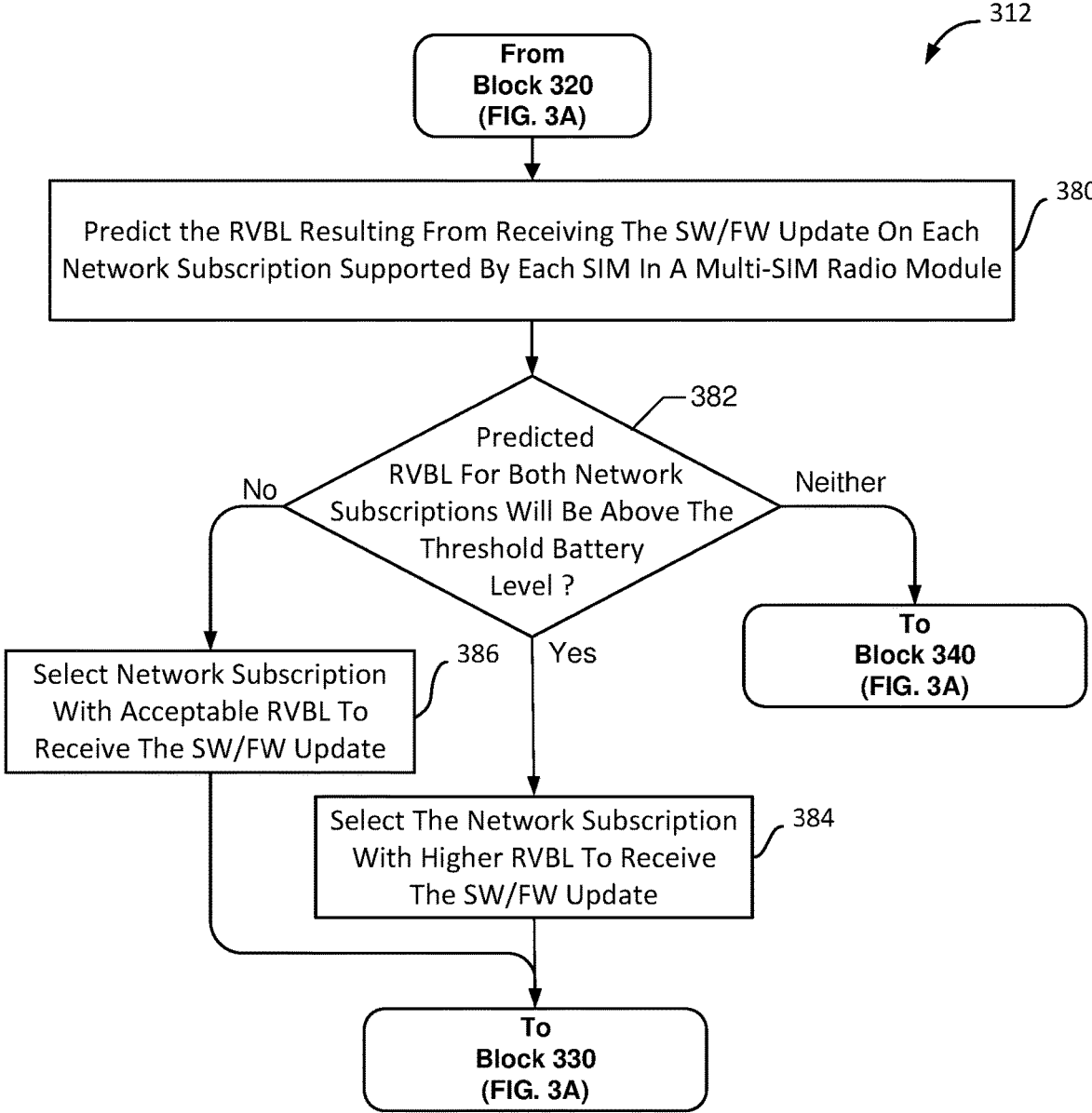

These options for multi-SIM equipped processing systems are reflected in the process flow diagram of example operations 312 as part of the method 300 illustrated in FIG. 3G in accordance with some embodiments. With reference to FIGS. 1A-3G, the operations of the operations 312 may be performed by a vehicle processing system (e.g., 102, 121, 240) including one or more processors (e.g., 110, 123, 124, 126, 127, 128, 130) and/or hardware elements, any one or combination of which may be configured to perform any of the operations 312. Further, one or more processors within the processing system may be configured with software or firmware to perform various operations 312. To encompass any of the processor(s), hardware elements and software elements that may be involved in performing the operations 312, the elements performing method operations are referred to generally as a "processing system." Further, means for performing functions of operations 312 may include the vehicle processing system (e.g., 102, 121, 240) including one or more processors (e.g., 110, 123, 124, 126, 127, 128, 130), the memory 112, the input module 114, the output module 116, the radio module 118, a battery level sensor 106, and/or the sensors (e.g., 211-238, 254).

After receiving and implementing the SW/FW update inquiry regarding the SW/FW update for the vehicle during the (PTW) in block 320 of the method 300, the processing system may predict the RVBL resulting from resulting from receiving the SW/FW update on each network subscription supported by each SIM in a multi-SIM radio module in block 380. The processing system may predict the RVBL for each network subscription supported by each SIM using techniques described herein.

In determination block 382, the processing system may determine whether the predicted RVBL for both network subscriptions will be above the threshold battery level. This determination may involve performing the same operations as in determination block 325 as described for each network subscription.

In response to determining that the predicted RVBL for both network subscriptions will be above the threshold battery level (i.e., determination block 382="Yes"), the processing system may select the SIM and associated network subscription with the higher predicted RVBL to receive the SW/FW update in block 384. In implementations in which the multi-SIM radio module is operating in the DSDS, the processing system may trigger switching of the SIM/subscription used to receive Internet data services if the selected network subscription is not currently being used to receive Internet data services (i.e., switch to using the SIM/subscription associated with the higher predicted RVBL for receiving Internet data service).

In response to determining that the predicted RVBL for both network subscriptions will not be above the threshold battery level (i.e., determination block 382="No"), the processing system may select the SIM and associated network subscription with an acceptable predicted RVBL to receive the SW/FW update in block 386. Again, in implementations in which the multi-SIM radio module is operating in the DSDS, the processing system may trigger switching of the SIM/subscription used to receive Internet data services if the selected network subscription is not currently being used to receive Internet data services (i.e., switch to using the SIM/subscription associated with the acceptable predicted RVBL for receiving Internet data service).

After selecting the SIM and associated network subscription to receive the SW/FW update in block 384 or block 386, the processing system may perform the operations in block 330 to proceed with the SW/FW update as described.

In response to determining that neither of the predicted RVBL for the two network subscriptions will be above the threshold battery level (i.e., determination block 382="Neither"), the processing system may perform the operations in block 340 to prevent initiation of the SW/FW update at least temporarily as described.

FIG. 4 is an example of a history database for SW/FW updates over a cellular network, in accordance with various embodiments. With reference to FIGS. 1A-4, the database may track the vehicle's current processing system Cell and Vehicle Parking Information, which may be populated from processing system L-1 measurements in idle mode or from a history database. The history database may track processing system cell and frequent vehicle parking history/route information. The Time-Windows for the vehicle/processing system history information may represent the time when the data is/was collected.

In accordance with the methods and systems described herein various embodiments may introduce new requirements, processes, and frameworks for processing system and OEM/NW to predict the probability of success for a vehicle SW/FW update for the current vehicle location, configure threshold values, maintain/update cost functions and predictive models, and determine alternative options (e.g., if the RVBL is lower than a threshold).

Various embodiments may introduce new thresholds and procedures for a gNB and/or OEM server to send inquiry messages for SW/FW updates and configure the processing system to predict the vehicle battery consumption (or RVBL post SW/FW update). Additionally, various embodiments may introduce new IEs and procedures for the processing system to respond to SW/FW update inquiry messages.

Implementation examples are described in the following paragraphs. While some of the following implementation examples are described in terms of example systems and methods, further example implementations may include: the example operations discussed in the following paragraphs may be implemented by various vehicle computing devices; the example methods discussed in the following paragraphs implemented by computing device including a processing system including one or more processors configured with processor-executable instructions to perform operations of the methods of the following implementation examples; the example methods discussed in the following paragraphs implemented by a vehicle computing device including means for performing functions of the methods of the following implementation examples; and the example methods discussed in the following paragraphs may be implemented as a non-transitory processor-readable storage medium having stored thereon processor-executable instructions configured to cause a processing system of a vehicle computing device to perform the operations of the methods of the following implementation examples.

Example 1. A method for performing a software/firmware (SW/FW) update on a processing system of a vehicle, the method including: receiving, by the processing system, a SW/FW update inquiry regarding a SW/FW update with a permissible time window (PTW) for receiving and implementing the SW/FW update; predicting a residual vehicle battery level (RVBL) resulting from receiving and implementing the SW/FW update, in which the RVBL is predicted from a current vehicle battery level less a battery drain associated with receiving and implementing the SW/FW update; and transmitting, by the processing system, a SW/FW update response configured to initiate over-the-air reception by the processing system of the SW/FW update during the PTW in response to predicting that the RVBL after receiving and implementing the SW/FW update will be above a threshold battery level based on a location of the vehicle and the PTW.

Example 2. The method of example 1, further including: transmitting, by the processing system, a SW/FW update response configured to prevent initiation of the SW/FW update at least temporarily in response to predicting the current vehicle battery level is below a minimum battery level threshold associated with an estimated download data rate for the SW/FW update.

Example 3. The method of example 2, further including: receiving, by the processing system, at least one of alternative location information or an alternative time window for receiving and implementing the SW/FW update in response to transmitting the SW/FW update response configured to prevent initiation of the SW/FW update at least temporarily.

Example 4. The method of any of examples 1-3, in which predicting the RVBL resulting from receiving and implementing the SW/FW update accounts for at least one of size of the SW/FW update, a signal quality or a network configuration likely to be used for receiving and implementing the SW/FW update.

Example 5. The method of any of examples 1-3, in which predicting the RVBL resulting from receiving and implementing the SW/FW update accounts for a prior amount of battery consumption associated with receiving a prior SW/FW update.

Example 6. The method of any of examples 1-3, in which predicting the RVBL resulting from receiving and implementing the SW/FW update accounts for at least one of a vehicle specification specific to the vehicle, a battery specification of a battery of the vehicle, or processing specifications of the processing system of the vehicle.

Example 7. The method of any of examples 1-6, in which the SW/FW update response is configured to delay initiation of the SW/FW update in response to predicting that the RVBL resulting from receiving and implementing the SW/FW update will be above a lower residual vehicle battery threshold and below an upper residual vehicle battery threshold.

Example 8. The method of any of examples 1-7, further including: receiving, by the processing system, projected vehicle parking duration information, in which predicting the RVBL resulting from receiving and implementing the SW/FW update accounts for the projected vehicle parking duration information.

Example 9. The method of any of examples 1-8, in which the threshold battery level includes a low threshold and a high threshold such that at least one of an alternative location or alternative time window is established in response to predicting a RVBL resulting from receiving and implementing the SW/FW update will be between the low threshold and the high threshold.

Example 10. The method of any of examples 1-9, in which the SW/FW update inquiry indicates at least one of a size of the SW/FW update or a priority of the update.

Example 11. The method of any of examples 1-10, further including: predicting the RVBL resulting from receiving and implementing the SW/FW update on each of two network subscriptions; selecting one of the two network subscriptions with a highest predicted RVBL to receive the SW/FW update in response to the predicted RVBL of both network subscriptions will be above the threshold battery level; and selecting one of the two network subscriptions with a predicted RVBL above the threshold battery level to receive the SW/FW update in response to only one predicted RVBL will be above the threshold battery level.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 300-312 may be substituted for or combined with one or more operations of the methods and operations 300-312.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular. In addition, reference to the term "and/or" should be understood to include both the conjunctive and the disjunctive. For example, "A and/or B" means "A and B" as well as "A or B."

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processing system may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for performing a software/firmware (SW/FW) update on a processing system of a vehicle, the method comprising:

receiving, by the processing system, a SW/FW update inquiry regarding a SW/FW update with a permissible time window (PTW) for receiving and implementing the SW/FW update;

predicting a residual vehicle battery level (RVBL) resulting from receiving and implementing the SW/FW update, wherein the RVBL is predicted from a current vehicle battery level less a battery drain associated with receiving and implementing the SW/FW update; and transmitting, by the processing system, a SW/FW update response configured to initiate over-the-air reception by the processing system of the SW/FW update during the PTW in response to predicting that the RVBL after receiving and implementing the SW/FW update will be above a threshold battery level based on a location of the vehicle and the PTW.

2. The method of claim 1, further comprising:

transmitting, by the processing system, a SW/FW update response configured to prevent initiation of the SW/FW update at least temporarily in response to predicting the current vehicle battery level is below a minimum battery level threshold associated with an estimated download data rate for the SW/FW update.

3. The method of claim 2, further comprising:

receiving, by the processing system, at least one of alternative location information or an alternative time window for receiving and implementing the SW/FW update in response to transmitting the SW/FW update response configured to prevent initiation of the SW/FW update at least temporarily.

4. The method of claim 1, wherein predicting the RVBL resulting from receiving and implementing the SW/FW update accounts for at least one of size of the SW/FW update, a signal quality or a network configuration likely to be used for receiving and implementing the SW/FW update.

5. The method of claim 1, wherein predicting the RVBL resulting from receiving and implementing the SW/FW update accounts for a prior amount of battery consumption associated with receiving a prior SW/FW update.

6. The method of claim 1, wherein predicting the RVBL resulting from receiving and implementing the SW/FW update accounts for at least one of a vehicle specification specific to the vehicle, a battery specification of a battery of the vehicle, or processing specifications of the processing system of the vehicle.

7. The method of claim 1, wherein the SW/FW update response is configured to delay initiation of the SW/FW update in response to predicting that the RVBL resulting from receiving and implementing the SW/FW update will be above a lower residual vehicle battery threshold and below an upper residual vehicle battery threshold.

8. The method of claim 1, further comprising:
receiving, by the processing system, projected vehicle parking duration information, wherein predicting the RVBL resulting from receiving and implementing the SW/FW update accounts for the projected vehicle parking duration information.

9. The method of claim 1, wherein the threshold battery level includes a low threshold and a high threshold such that at least one of an alternative location or alternative time window is established in response to predicting a RVBL resulting from receiving and implementing the SW/FW update will be between the low threshold and the high threshold.

10. The method of claim 1, wherein the SW/FW update inquiry indicates at least one of a size of the SW/FW update or a priority of the SW/FW update.

11. The method of claim 1, further comprising:
predicting the RVBL resulting from receiving and implementing the SW/FW update on each of two network subscriptions;
selecting one of the two network subscriptions with a highest predicted RVBL to receive the SW/FW update in response to the predicted RVBL of both network subscriptions will be above the threshold battery level; and
selecting one of the two network subscriptions with a predicted RVBL above the threshold battery level to receive the SW/FW update in response to only one predicted RVBL will be above the threshold battery level.

12. A vehicle, comprising:
a vehicle battery;
a battery level sensor coupled to the vehicle battery;
one or more memories; and
a processing system coupled to the one or more memories and the battery level sensor, the processing system comprising one or more processors configured to:
receive a software/firmware (SW/FW) update inquiry regarding a SW/FW update with a permissible time window (PTW) for receiving and implementing the SW/FW update;
predict a residual vehicle battery level (RVBL) resulting from receiving and implementing the SW/FW update, wherein the RVBL is predicted from a current vehicle battery level less a battery drain associated with receiving and implementing the SW/FW update; and
transmit a SW/FW update response configured to initiate over-the-air reception by the processing system of the SW/FW update during the PTW in response to predict that the RVBL after receiving and implementing the SW/FW update will be above a threshold battery level based on a location of the vehicle and the PTW.

13. The vehicle of claim 12, wherein one or more processors of the processing system are further configured to:
transmit a SW/FW update response configured to prevent initiation of the SW/FW update at least temporarily in response to predict the current vehicle battery level is below a minimum battery level threshold associated with an estimated download data rate for the SW/FW update.

14. The vehicle of claim 13, wherein one or more processors of the processing system are further configured to:
receive at least one of alternative location information or an alternative time window for receiving and implementing the SW/FW update in response to transmitting the SW/FW update response configured to prevent initiation of the SW/FW update at least temporarily.

15. The vehicle of claim 12, wherein one or more processors of the processing system are further configured to predict the RVBL resulting from receiving and implementing the SW/FW update accounts for at least one of size of the SW/FW update, a signal quality or a network configuration likely to be used for receiving and implementing the SW/FW update.

16. The vehicle of claim 12, wherein one or more processors of the processing system are further configured to predict the RVBL resulting from receiving and implementing the SW/FW update accounting for a prior amount of battery consumption associated with receiving a prior SW/FW update.

17. The vehicle of claim 12, wherein one or more processors of the processing system are further configured to predict the RVBL resulting from receiving and implementing the SW/FW update accounting for at least one of a vehicle specification specific to the vehicle, a battery specification of the vehicle battery, or processing specifications of the processing system of the vehicle.

18. The vehicle of claim 12, wherein one or more processors of the processing system are further configured to configure the SW/FW update response to delay initiation of the SW/FW update in response to predicting that the RVBL resulting from receiving and implementing the SW/FW update will be above a lower residual vehicle battery threshold and below an upper residual vehicle battery threshold.

19. The vehicle of claim 12, wherein one or more processors of the processing system are further configured to:
receive projected vehicle parking duration information; and
predict the RVBL resulting from receiving and implementing the SW/FW update accounting for the projected vehicle parking duration information.

20. The vehicle of claim 12, wherein:
the threshold battery level includes a low threshold and a high threshold;
one or more processors of the processing system are further configured to such establish at least one of an alternative location or alternative time window in response to predicting a RVBL resulting from receiving and implementing the SW/FW update will be between the low threshold and the high threshold.

21. The vehicle of claim 12, wherein one or more processors of the processing system are further configured to:
predict the RVBL resulting from receiving and implementing the SW/FW update on each of two network subscriptions;

select one of the two network subscriptions with a highest predicted RVBL to receive the SW/FW update in response to the predicted RVBL of both network subscriptions will be above the threshold battery level; and select one of the two network subscriptions with a predicted RVBL above the threshold battery level to receive the SW/FW update in response to only one predicted RVBL will be above the threshold battery level.

22. A processing system for use in a vehicle, comprising:
one or more processors configured to:
    receive a software/firmware (SW/FW) update inquiry regarding a SW/FW update with a permissible time window (PTW) for receiving and implementing the SW/FW update;
    predict a residual processing system battery level (RVBL) resulting from receiving and implementing the SW/FW update, wherein the RVBL is predicted from a current processing system battery level less a battery drain associated with receiving and implementing the SW/FW update; and
    transmit a SW/FW update response configured to initiate over-the-air reception by the processing system of the SW/FW update during the PTW in response to predict that the RVBL after receiving and implementing the SW/FW update will be above a threshold battery level based on a location of the processing system and the PTW.

23. The processing system of claim 22, wherein the one or more processors are further configured to:
    transmit a SW/FW update response configured to prevent initiation of the SW/FW update at least temporarily in response to predict the current processing system battery level is below a minimum battery level threshold associated with an estimated download data rate for the SW/FW update.

24. The processing system of claim 23, wherein the one or more processors are further configured to:
    receive at least one of alternative location information or an alternative time window for receiving and implementing the SW/FW update in response to transmitting the SW/FW update response configured to prevent initiation of the SW/FW update at least temporarily.

25. The processing system of claim 22, wherein the one or more processors are further configured to predict the RVBL resulting from receiving and implementing the SW/FW update accounts for at least one of size of the SW/FW update, a signal quality or a network configuration likely to be used for receiving and implementing the SW/FW update.

26. The processing system of claim 22, wherein the one or more processors are further configured to configure the SW/FW update response to delay initiation of the SW/FW update in response to predicting that the RVBL resulting from receiving and implementing the SW/FW update will be above a lower residual processing system battery threshold and below an upper residual processing system battery threshold.

27. The processing system of claim 22, wherein the one or more processors are further configured to:
    receive projected processing system parking duration information; and
    predict the RVBL resulting from receiving and implementing the SW/FW update accounting for the projected processing system parking duration information.

28. The processing system of claim 22, wherein:
the threshold battery level includes a low threshold and a high threshold;
one or more processors of the processing system are further configured to such establish at least one of an alternative location or alternative time window in response to predicting a RVBL resulting from receiving and implementing the SW/FW update will be between the low threshold and the high threshold.

29. The processing system of claim 22, wherein the one or more processors are further configured to:
    predict the RVBL resulting from receiving and implementing the SW/FW update on each of two network subscriptions;
    select one of the two network subscriptions with a highest predicted RVBL to receive the SW/FW update in response to the predicted RVBL of both network subscriptions will be above the threshold battery level; and
    select one of the two network subscriptions with a predicted RVBL above the threshold battery level to receive the SW/FW update in response to only one predicted RVBL will be above the threshold battery level.

30. A vehicle, comprising:
means for measuring a current battery level of a vehicle battery;
means for receiving a SW/FW update inquiry regarding a SW/FW update with a permissible time window (PTW) for receiving and implementing the SW/FW update;
means for predicting a residual vehicle battery level (RVBL) resulting from receiving and implementing the SW/FW update, wherein the RVBL is predicted from the current battery level less a battery drain associated with receiving and implementing the SW/FW update; and
means for transmitting a SW/FW update response configured to initiate over-the-air reception by the processing system of the SW/FW update during the PTW in response to predicting that the RVBL after receiving and implementing the SW/FW update will be above a threshold battery level based on a location of the vehicle and the PTW.

* * * * *